United States Patent [19]

Nohira et al.

[11] 4,171,691
[45] Oct. 23, 1979

[54] EXHAUST GAS RECIRCULATION CONTROL SYSTEM FOR AN INTERNAL COMBUSTION ENGINE

[75] Inventors: Hidetaka Nohira, Mishima; Kiyoshi Kobashi, Susono; Jiro Nakano, Toyota, all of Japan

[73] Assignee: Toyota Jidosha Kogyo Kabushiki Kaisha, Toyota, Japan

[21] Appl. No.: 850,470

[22] Filed: Nov. 10, 1977

[30] Foreign Application Priority Data

Aug. 30, 1977 [JP] Japan .............................. 52-103954

[51] Int. Cl.$^2$ ........................................... F02M 25/06
[52] U.S. Cl. ................................................. 123/119 A
[58] Field of Search ......... 123/119 A, 32 EA, 32 EB; 364/442

[56] References Cited

U.S. PATENT DOCUMENTS

| | | | |
|---|---|---|---|
| 3,794,003 | 2/1974 | Reddy | 123/32 EA |
| 3,815,560 | 6/1974 | Wahl | 123/119 A |
| 3,963,011 | 6/1976 | Saito | 123/119 A |
| 3,969,614 | 7/1976 | Moyer | 123/32 EB |
| 4,009,699 | 3/1977 | Hetzler | 123/32 EB |
| 4,128,885 | 12/1978 | Valek | 364/442 |

OTHER PUBLICATIONS

"Electronic Fuel Injecton Reduces Automotive Pollution" Electronics; Sep. 11, 1972, by M. Williams; pp. 121-125, 364-442.

*Primary Examiner*—Bernard Konick
*Assistant Examiner*—Alan Faber
*Attorney, Agent, or Firm*—Stevens, Davis, Miller & Mosher

[57] ABSTRACT

An exhaust gas recirculation control system for an internal combustion engine wherein the control is effected so as to accord intake manifold pressure of the engine to target values predetermined for various operating conditions of the engine and retained in a memory means, wherein the target values are modified in accordance with atmospheric pressure to a compensater for the reduction in atmospheric pressure at high altitutde and to modify the ratio of exhaust gas recirculation in operation of the engine at high altitude when compared with its operation at sea level.

5 Claims, 5 Drawing Figures

EXHAUST GAS RECIRCULATION CONTROL SYSTEM FOR AN INTERNAL COMBUSTION ENGINE

BACKGROUND OF THE INVENTION

The present invention relates to exhaust gas recirculation effected in internal combustion engines for the purpose of controlling emission of noxious components in exhaust gases from the engine, and, more particularly, to an exhaust gas recirculation control system for controlling the exhaust gas recirculation.

When exhaust gas recirculation is effected in an internal combustion engine, it is important that the amount of exhaust gases recirculated is properly controlled in accordance with the operating conditions of the engine so that the requirement for controlling emission of noxious components is balanced against the requirement for good performance of the engine, i.e. of the vehicle.

As an exhaust gas recirculation control system, there has been proposed a system which employs an electronic control means having a memory means and controls an exhaust gas recirculation control valve directly or indirectly by an electronic signal produced by the electronic control means so as to effect the optimum exhaust gas recirculation in various operating conditions of the engine.

As a type of electronic exhaust gas recirculation control system, it has been proposed in a co-pending Japanese Patent Application No. 56292/77 filed May 18, 1977 to provide a system which depends upon the processes of retaining target values for the intake manifold pressure (absolute) of the engine which provide the optimum exhaust gas recirculation in various operating conditions of the engine determined by the combination of the intake air flow and the rotational speed of the engine, detecting the current values of the intake air flow and the rotational speed of the engine in operation, reading out a particular target value from the retained target values in accordance with the current values of the intake air flow and the rotational speed of the engine, comparing the read-out target value with the current intake manifold pressure of the engine, and controlling the flow of recirculating exhaust gases in a manner to accord the intake manifold pressure of the engine to the read-out target value.

When a vehicle which mounts an engine equipped with the abovementioned exhaust gas control system is operated at high altitude, if the power output condition of the engine is the same as in the operation at sea level, the exhaust gas recirculation is performed at the same rate as in the operation at sea level, because although atmospheric pressure lowers as altitude increases, the target intake manifold pressure retained in the memory means in accordance with the intake air flow and the rotational speed of the engine does not change, and the intake air flow does not change substantially in accordance with altitude if the power output condition of the engine does not change. The target intake manifold pressure is of course set at values which are lower than atmospheric pressure at sea level corresponding to the intake manifold vacuum in various operating conditions. However, when the altitude at which the engine is operated increases, the difference between the actual atmospheric pressure and the target intake manifold pressure decreases, and it may possibly happen that the target intake manifold pressure becomes higher than the actual atmospheric pressure. This means that even when the engine is operating at full load, exhaust gas recirculation is performed. This is not desirable from the point of view of ensuring sufficiently high power even in high altitude operation of the engine.

SUMMARY OF THE INVENTION

It is therefore the primary object of the present invention to provide an exhaust gas recirculation control system for an internal combustion engine which provides optimum exhaust gas recirculation, controlled in accordance with operational conditions of the engine and modified in accordance with variation of atmospheric pressure.

Another object of the present invention is to provide an exhaust gas recirculation control system of the aforementioned atmospheric pressure modification type wherein the control of exhaust gas recirculation is further modified to give priority to ensuring high output power of the engine over suppressing emission of noxious components when the engine is operated at high altitude higher than a predetermined level, where the reduction of output power of the engine under full load becomes considerable, while the problem of air contamination due to exhaust gases of the engine also becomes less serious.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
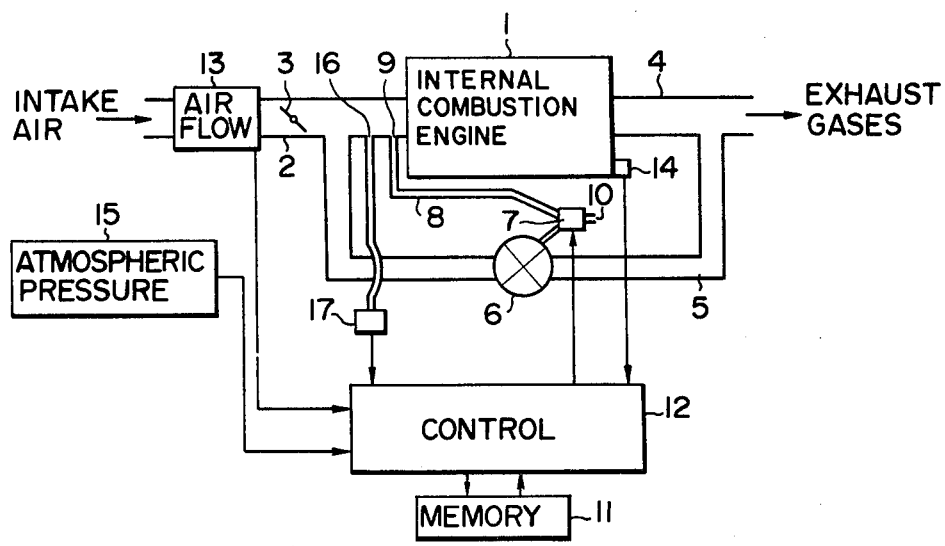
FIG. 1 is a diagram showing an embodiment of the exhaust gas recirculation control system of the present invention incorporated in an internal combustion engine.

Referring to FIG. 1, an internal combustion engine diagrammatically shown by a block 1 takes in fuel-air mixture through an intake manifold 2 and discharges exhaust gases through an exhaust manifold 4. A throttle valve 3 is provided in the intake passage of the engine, and is generally provided in a carburetor mounted upstream of the intake manifold so as to control the supply of intake air. A passage 5 connecting the intake and the exhaust manifolds 2 and 4 provides an exhaust gas recirculation system for recirculating a part of the exhaust gases to the intake manifold of the engine. An exhaust gas recirculation control valve 6 is provided at a middle portion of the passage 5. The exhaust gas recirculation control valve 6 is, in the shown embodiment, a diaphragm type control valve which has a diaphragm chamber and is adapted to increase its opening as the vacuum supplied to the diaphragm chamber increases so as to increase the flow of exhaust gases recirculating through the passage 5. The diaphragm chamber of the exhaust gas recirculation control valve 6 is supplied with intake vacuum of the engine taken out from a port 9 by a vacuum conduit 8 including a vacuum control valve 7 provided at a middle portion thereof. The vacuum control valve 7 is an electromagnetic valve and is adapted to connect the diaphragm chamber of the control valve 6 to the intake vacuum take-out port 9 when energized, while it connects the diaphragm chamber of the control valve 6 to a bleed port 10 when de-energized. The vacuum control valve 7 is controlled by an electronic control means 12 having a memory means 11.

The memory means 11 may be a programmable read-only memory and retains target valve Ptref for the intake manifold pressure (absolute) of the engine which provide optimum exhaust gas recirculation in various operating conditions of the engine as expressed by the combination of values of the intake air flow and the rotational speed of the engine. The ratio of exhaust gas recirculation which provides the optimum amount of exhaust gas recirculation varies in accordance with the operating condition of the engine, and the operating condition of the engine is determined from the combination of the values of the intake air flow and the rotational speed of the engine. Consequently, the optimum amount of flow of recirculating exhaust gases is determined in accordance with the intake air flow and the rotational speed of the engine if the optimum exhaust gas recirculation ratio is beforehand determined in accordance with the combination of the intake air flow and the rotational speed of the engine. Since the total gas flow in the intake manifold is substantially the sum of intake air flow and the flow of exhaust gases recirculated, the optimum intake manifold pressure is determined as a function of the intake air flow, the rotational speed, and the optimum exhaust gas recirculation ratio. The values of the optimum intake manifold pressure thus determined with respect to various operating conditions of the engine are retained in the memory means as target values for the intake manifold pressure. Of course these target values are obtained by experiments performed with actual engines. The target values are retained in the form of digital electronic signals.

The control means 12 includes a read-out curcuit such as a microprocessor for reading out a particularly target value Ptref in accordance with the current values of the intake air flow and the rotational speed of the engine detected by an air flow sensor 13 and a rotational speed sensor 14 respectively, a circuit for compensating the read-out target value for the intake manifold pressure in accordance with atmospheric pressure so as to provide a modified target value Ptref' when the atmospheric pressure detected by a pressure sensor 15 is lower than a predetermined value, and a circuit for comparing the actual intake manifold pressure Ptreal (absolute) detected by a pressure sensor 17 with the modified target value Ptref' and for producing an electronic output signal for controlling the vacuum control valve 7.

Figure 2:
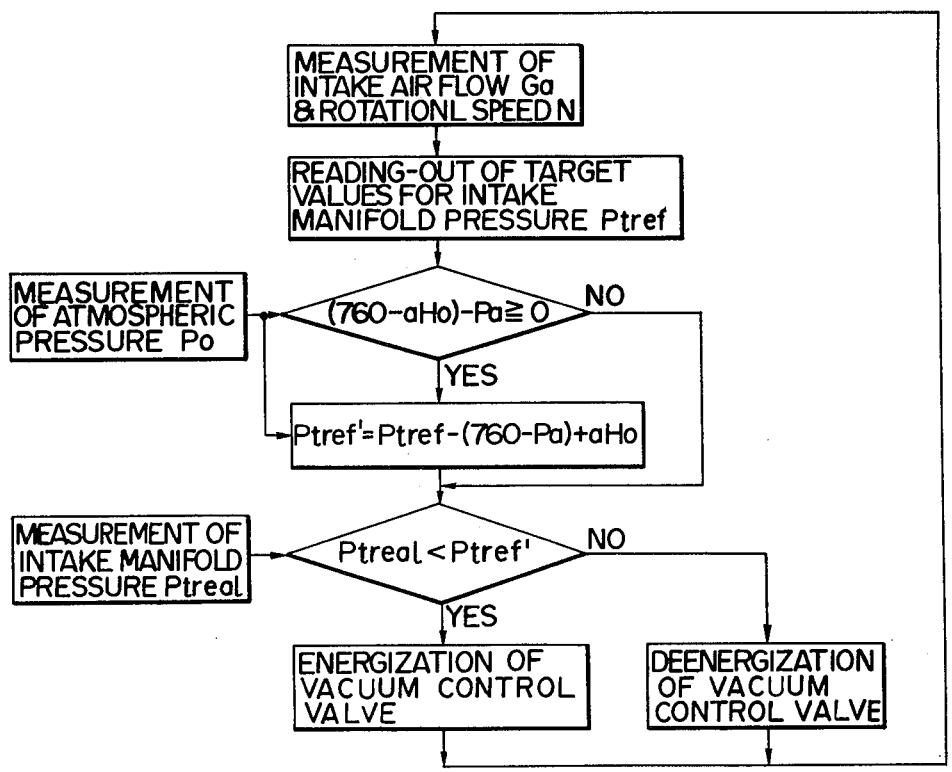
FIG. 2 is a flow chart showing the control processes performed in the control system of the present invention.

The control operation of the present exhaust gas recirculation control system will be explained hereinunder with reference to the flow chart shown in FIG. 2.

It is assumed that the engine is operating in a certain output condition. The current intake air flow Ga and engine rotational speed N of the engine are detected by the air flow sensor 13 and the rotational speed sensor 14, respectively. The signals dispatched from the air flow sensor 13 and the rotational speed sensor 14 are processed in the control means 12, whereupon the control means 12 reads out a particular target value Ptref from the memory means 11 which corresponds to the detected values of Ga and N. The control means 12 performs the following calculation and comparison, using also an input corresponding to the actual atmospheric pressure Pa dispatched from the pressure sensor 15:

$$(760 - a\ Ho) - Pa \gtreqless 0 \qquad (1)$$

Herein Ho is the altitude above which the modification in accordance with atmospheric pressure is effected, and should desirably be 300–1600 meters above sea level. a is a coefficient for the reduction of atmospheric pressure per one meter increase in altitude, and is actually 0.05–0.15 mmHg/m.

If the result of the subtraction in formula (1) is zero or positive, the process transfers along the route "yes", and the following calculation is performed:

$$Ptref' = Ptref - (760 - Pa) + a\ Ho \qquad (2)$$

In accordance with formula (2), the target value Ptref read out from the memory means 11 is modified in accordance with the actual atmospheric pressure so as to produce the modified target value Ptref'. On the other hand, if the result of the subtraction by formula (1) is negative, the process proceeds along the route indicated by "no", whereby the calculation in accordance with formula (2) is omitted. In this case, therefore, Ptref' is equal to Ptref. In other words, if the altitude is lower than a predetermined level, no modification of the read-out target value in accordance with atmospheric pressure is effected, whereas if the altitude is higher than the predetermined level, the read-out target value is modified in accordance with the actual atmospheric pressure. The modification of the read-out target value due to atmospheric pressure is made in accordance with a linear function such as shown by formula (2), although the manner of this modification is only an embodiment of the present invention.

The variation of atmospheric pressure Pa in accordance with the altitude is approximately expressed by the following formula:

$$Pa = 760 - a\ H \qquad (3)$$

Figure 3:
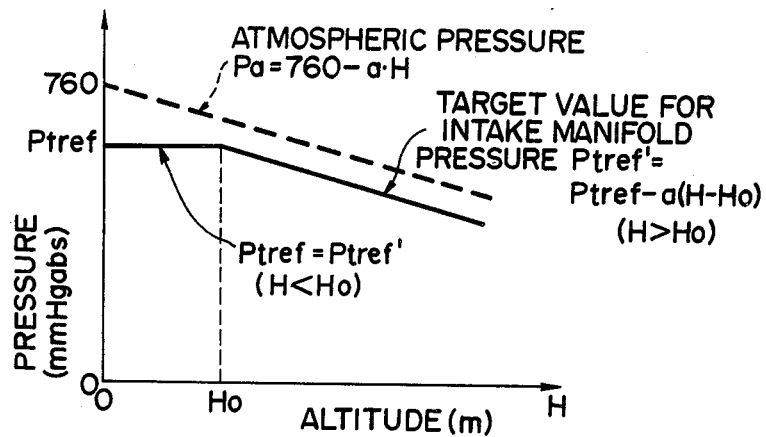
FIG. 3 is a graph showing the manner of modifying the target value for the intake manifold pressure of the engine in accordance with variation of atmospheric pressure.

Referring to FIG. 3, which has the altitude in meters as the abscissa and atmospheric pressure in mmHg abs as the ordinate, the variation of Pa is shown by the broken line. On the other hand, the solid line in FIG. 3 shows the maximum value of the modified target value Ptref' for the intake manifold pressure.

The modified final target value Ptref' is compared with the current intake manifold pressure Ptreal detected by the pressure sensor 17 in the control means 12, and if Ptreal is smaller than Ptref' the control means 12 delivers an electronic output which opens the vacuum control valve 7 so as to transmit the intake vacuum detected by the port 9 to the diaphragm chamber of the exhaust gas recirculation control valve 6, whereby the control valve 6 is opened so as to increase the flow of recirculating exhaust gases. As a consequence of the increase of the flow of recirculating exhaust gases thus effected, the actual intake manifold pressure Ptreal increases, and finally the control of exhaust gas recirculation is balanced to maintain the condition of Ptref'=Ptreal. On the other hand, if Ptreal is larger than Ptref', no electronic output signal is delivered to the vacuum control valve 7, whereby the diaphragm chamber of the exhaust gas recirculation control valve 6 is opened to the atmosphere so that the control valve 6 is biased towards the closed position. As a consequence of the reduction of the flow of recirculating exhaust gases thus effected, the actual intake manifold pressure Ptreal lowers so that finally the condition of Ptref'=Ptreal is attained.

In accordance with the aforementioned manner of control, if the altitude is lower than a predetermined level, exhaust gas recirculation is effected depending upon the preset ratios of exhaust gas recirculation, and if the altitude increases beyond the predetermined level, the ratio of exhaust gas recirculation is reduced in accordance with the reduction of atmospheric pressure so as to give preference to maintaining the engine output power over controlling the emission of noxious components during the use of the engine at high altitude. In the above explained embodiemnt, when the altitude is higher than a predetermined level Ho, the read-out target value Ptref for the intake manifold pressure is modified to Ptref' by the amount a(H-Ho) being subtracted therefrom in accordance with the actual altitude H. However of course the modification of the read-out target value for the intake manifold pressure may be modified in accordance with other formulae.

The abovementioned control is performed by employing a difference amplifier for the comparison of the read-out target value for the intake manifold pressure and the actual intake manifold pressure and a hybrid control system composed of analog and digital systems. However, an entirely digital control system may also be employed.

Figure 4:
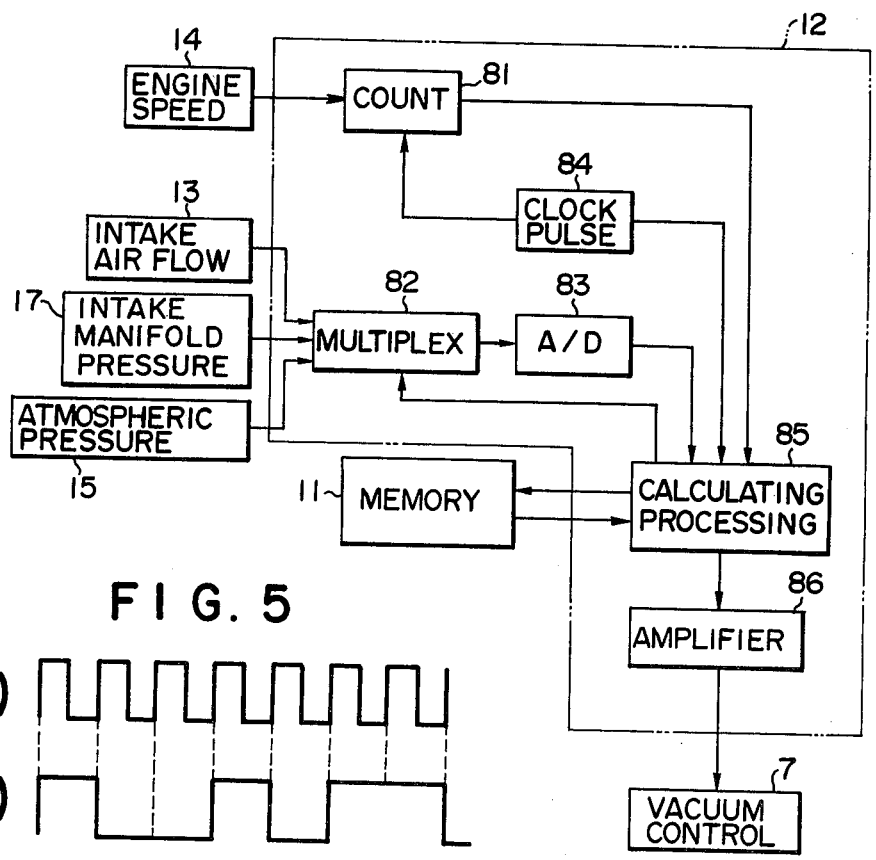
FIG. 4 is a block diagram of an embodiment of a digital type of the exhaust gas recirculation system of the present invention.

FIG. 4 is a block diagram showing a digital embodiment of the control system of the present invention. A counter circuit 81 counts the pulse signals delivered from the engine rotational speed sensor 14 in accordance with the time intervals determined by clock pulses delivered from a clock pulse generating circuit 84 and provides a pulse number which represents the current rotational speed of the engine. An analog multiplexer 82 deals with signals received from the intake air flow sensor 13, the intake manifold pressure sensor 17 and the atmospheric pressure sensor 15 in a time-chopping manner in accordance with the instructions received from a calculating/processing means 85 and delivers its output to an A/D converter 83. The calculating/processing means 85 performs a predetermined calculation depending upon digital values representing the rotational speed and the intake air flow of the engine and reads out a corresponding target value Ptref for the intake manifold pressure. Furthermore, the calculating/processing means 85 performs a calculation for modifying the read-out target value depending upon digital value of the actual atmospheric pressure delivered from the A/D converter 83 and provides a modified final target value Ptref' for the intake manifold pressure. On the other hand, the actual intake manifold pressure Ptreal detected by the intake manifold pressure sensor 17 and processed by the A/D converter 83 is supplied to the calculating/processing means 85 and is compared therein with the aforementioned final target value Ptref' in synchronization with the clock signal delivered from the clock pulse generating circuit 84. The calculating/processing means 85 produces a binary logic output, either "1" or "0", in accordance with the difference between Ptreal and Ptref', said logic output being delivered to an amplifier 86 which produces a corresponding ON/OFF electronic output signal for operating the vacuum control valve 7.

Figure 5:
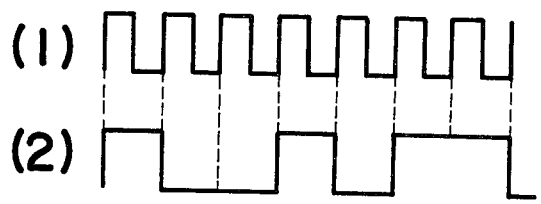
FIG. 5 shows the clock signal and the operation signal used in the system shown in FIG. 4.

FIG. 5 shows an example of the aforementioned ON/OFF electronic signal in relation to the clock signal. In this case the calculation for comparing the actual value and the target value of said fluid pressure is triggered by the build-up edge of the clock signal (1), and, in accordance with the logic output "1" or "0" thereby obtained, the operating signal (2) for the pressure control valve 7 is produced by electrical amplification of the logic output in the amplifier 86.

From the foregoing, it will be appreciated that the exhaust gas recirculation system of the present invention provides a desired modification to the ratio of exhaust gas recirculation in accordance with variation of atmospheric pressure, wherein the modification is on the one hand to compensate for the reduction of atmospheric pressure at high altitude, so that the target value for the control, which is a value of intake manifold pressure of the engine, is correspondingly reduced in accordance with the reduction of atmospheric pressure, and on the other hand the modification is to give preference to ensuring high output power of the engine over controlling the emission of noxious components in operation at high altitudes.

Although the invention has been shown and described with respect to a preferred embodiment thereof, it should be understood by those skilled in the art that various changes and omissions from the form and the detail thereof may be made therein without departing from the scope of the invention.

We claim:

1. An exhaust gas recirculation control system for an internal combustion engine, comprising a passage for conducting exhaust gases to be recirculated, an exhaust gas recirculation control valve for controlling said passage, an air flow sensor for detecting the intake air flow of the engine, a rotational speed sensor for detecting the rotational speed of the engine, a first pressure sensor for detecting the intake manifold pressure of the engine, a second pressure sensor for detecting atmospheric pressure, a memory means for retaining target values for the intake manifold pressure of the engine which provide the optimum exhaust gas recirculation in various operating conditions of the engine, said operating conditions of the engine being expressed by the combination of the intake air flow and the rotational speed of the engine, and a control means which reads out a particular target value for the intake manifold pressure from said memory means in accordance with the current values of the intake air flow and the rotational speed of the engine detected by said air flow sensor and said rotational speed sensor respectively, modifies the read-out target value in accordance with the atmospheric pressure detected by said second pressure sensor, compares the modified target value with the current value of the intake manifold pressure detected by said first pressure sensor, and controls said exhaust gas recirculation control valve so as to accord the intake manifold pressure to the modified target value.

2. The control system of claim 1, wherein said control means is adapted to modify said read-out target value by subtracting an amount "a(H-Ho)" therefrom, where Ho is a predetermined altitude above which the modification of the read-out target value in accordance with atmospheric pressure is effected, H is the actual altitude, and a is a certain coefficient.

3. The control system of claim 1, wherein said control means includes means for converting analog values to digital values and a digital calculating/processing means so as to produce an ON/OFF electronic signal, while said exhaust gas recirculation control valve is a diaphragm type control valve having a diaphragm chamber, said control system further including a vacuum conduit for conducting intake manifold vacuum of the engine to said diaphragm chamber, and an electromagnetic type pressure control valve provided at a middle portion of said conduit for selectively communicating said conduit or intercepting said conduit while venting said diaphragm chamber to the atmosphere in accordance with the value of said ON/OFF electronic signal.

4. A method of controlling exhaust gas recirculation in an internal combustion engine, comprising the processes of retaining target values for the intake manifold pressure of the engine which provide the optimum exhaust gas recirculation in various operating conditions of the engine as determined by the combination of the intake air flow and the rotational speed of the engine, detecting the current values of the intake air flow and the rotational speed of the engine in operation, reading out a particular target value from the retained target values in accordance with the current values of the intake air flow and the rotational speed of the engine, modifying the read-out target value in accordance with atmospheric pressure, comparing the modified target value with the current intake manifold pressure of the engine, and controlling the flow of recirculating exhaust gases in a manner to accord the intake manifold pressure of the engine to the modified target value.

5. The method of claim 4, wherein the modification of the read-out target value is made by subtracting an amount "a(H-Ho)" from the read-out target value, where Ho is a predetermined altitude above which the modification of the read-out target value is effected, H is the actual altitude, and a is a certain coefficient.

* * * * *